United States Patent
Loftman et al.

(10) Patent No.: US 7,074,186 B2
(45) Date of Patent: Jul. 11, 2006

(54) TRANSMIT BASED AXIAL WHITENING

(75) Inventors: Rickard C. Loftman, Menlo Park, CA (US); Karen E. Morgan, Leesburg, VA (US); Erkan Mumcuoglu, Ankara (TR); Kutay F. Ustuner, Mountain View, CA (US); Zoran Banjanin, New Castle, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 510 days.

(21) Appl. No.: 10/668,915

(22) Filed: Sep. 23, 2003

(65) Prior Publication Data

US 2005/0107699 A1  May 19, 2005

(51) Int. Cl.
*A61B 8/00* (2006.01)
*A61B 8/12* (2006.01)
*A61B 8/14* (2006.01)

(52) U.S. Cl. ..................... 600/437; 600/443
(58) Field of Classification Search ......... 600/437–472
See application file for complete search history.

(56) References Cited

U.S. PATENT DOCUMENTS

| 4,470,303 | A | 9/1984 | O'Donnell |
| 4,881,549 | A | 11/1989 | Rhyne |
| 5,675,554 | A | 10/1997 | Cole et al. |
| 5,685,308 | A | 11/1997 | Wright et al. |
| 6,110,115 | A | 8/2000 | Ustuner et al. |
| 6,312,379 | B1 | 11/2001 | Bradley et al. |
| 6,358,209 | B1 | 3/2002 | Ustuner et al. |

*Primary Examiner*—Ali Imam

(57) ABSTRACT

Transmit based axial whitening is provided. Ultrasonic waveforms to be transmitted are designed to provide for wideband imaging characteristics prior to detection. Rather than transmitting a waveform having a spectral magnitude as white or flat as possible, waveforms with adjusted spectral content, such as spectrally bi-modal waveforms are generated in order to compensate for subsequent effects. Prior to detection, a more wideband or whiter signal response is provided in response to the transmitted waveform. Any of various alterations of the transmit waveform, such as asymmetric, spectrally bi-modal or other characteristics in anticipation of a system transfer function or physical phenomena through which the signal passes electronically or acoustically to result in a wideband or white spectral magnitude and generally linear spectral phase is used. The transmit waveform is altered to improve the imaging characteristics of the downstream processing.

36 Claims, 4 Drawing Sheets

−XMT SPECTRUM AT DL −−XDCR SEQUOIA IMPULSE RESPONSE W/ ELEVATION DIFFRACTION AND ATTENTUATION , ADC INPUT

−DEMODULATED SYSTEM RESPONSE −−$d\beta$ F INPUT−, $d\beta$ F OUTPUT,·$d\beta$ F

TRANSMIT BASED AXIAL WHITENING

BACKGROUND

The present invention relates to wideband imaging. In particular, axial whitening is provided for detail and contrast resolution in medical diagnostic ultrasound imaging.

Transmit electrics, the transducer, propagation, reflection and receive circuitry reduce or alter the bandwidth of transmitted information. Axial resolution is reduced as the bandwidth of the signal decreases. To improve bandwidth, transmit signals with a maximum or greater bandwidth are transmitted. For example, a transmit waveform with a low-pass filtered envelope is generated with a single center frequency or with a chirped frequency range. The spectral magnitude is constant over a range of the imaging frequency band. The white or flat portion of the spectral magnitude may be as wide as allowable by the transmit circuitry. The white transmit spectral amplitude more likely provides wideband or whitened receive information for imaging. However, the filtering or response of various circuits, tissue and targets may still reduce the bandwidth.

Axial whitening is provided on the receive signal to increase bandwidth. U.S. Pat. Nos. 4,881,549, 4,470,303, 6,358,209 and 6,110,115 disclose techniques for whitening the receive signal. Downstream of the acoustic interrogation of a target field, the signal is selectively filtered so that non-equal spectral magnitude within an imaging frequency band is adjusted to provide a white or substantially flat spectral magnitude. Pre- or post-detected data may be whitened, but the bandwidth is still limited by the response or transfer function of the transmit circuitry, propagation, the target and receive circuitry. For whitening pre-detected data, a base band filter is adapted to suppress DC components or accentuate out-of-band components. For post-detected data, a video filter accentuates out-of-band components.

The spectral content of the transmit waveform may be altered for various reasons. For example, U.S. Pat. No. 6,312,379 discloses predistortion of a transmit waveform for elimination of transmitted energy in a second harmonic of a fundamental transmit frequency band. To better isolate information at the second harmonic frequencies generated by propagation or reflection rather than by transmitted energy, energy transmitted at the second harmonic is counteracted by predistortion. An inverse second harmonic component is added to the transmit waveform so that transmit circuitry and transducer generated second harmonics are counteracted or removed. By removing energy at the second harmonic frequency band in a transmit pulse generated by the transducer, clutter due to the transmit circuitry and transducer for second harmonic imaging is removed or reduced. As another example, U.S. application Ser. No. 10/441,325 discloses using bi-modal or dual frequency cascaded transmit pulses, resulting in spectral components at two different frequencies for receiving information at an intermodulation frequency bands that may or may not overlap with one of the two transmitted frequency bands. By cascading pulses of different frequencies, spectral phase varies greatly due to the distinct frequency components occurring in distinct separate times. The spectral phase can be flat for frequencies corresponding to a first pulse but then will ramp significantly for frequencies corresponding to the second pulse, i.e. the phase is in non-linear. The use of cascaded pulses also may result in less detail resolution.

BRIEF SUMMARY

Preferred embodiments described below include methods and systems for transmit based axial whitening. Ultrasonic waveforms to be transmitted are designed to increase the imaging bandwidth. Rather than transmitting a waveform having a spectral magnitude as white or flat as possible, a spectrally preconditioned waveform is generated. Such a waveform is often non-intuitive with respect to the goal of wideband imaging. For instance, a spectrally bi-modal pulse may be employed, where frequency components corresponding to side bands of the imaging center frequency are accentuated. Prior to detection, a more wideband or whiter signal response results. Any of various alterations of the transmit waveform, such as drastically asymmetric, spectrally bi-modal or other characteristics in anticipation of a system transfer function or physical phenomena through which the signal passes electronically or acoustically to result in a wideband or white spectral magnitude and generally linear spectral phase is used. The transmit waveform is altered or preconditioned to improve the imaging characteristics of the downstream processing.

By using transmit waveforms adapted for whitening or wideband imaging, errors made in estimating tissue attenuation for beamforming may lead to shift in the depth at which maximum resolution occurs rather than reducing resolution at all depths as can occur with receive side whitening. Accentuating frequency components outside of a pass band on transmit may not cause an increase in noise or reduction of signal depending upon output level adjustments, such as those made to satisfy regulatory limits. With receive whitening, a loss of signal-to-noise ratio (SNR) results. For second harmonic imaging, altering the transmit waveform for wideband imaging may allow better fundamental clutter suppression. Receive side whitening requires applying gains to frequency content at a low side of the receive band which often contains undesired transmitted fundamental information. The information accentuated on the transmit side for whitening is generally at frequencies away from the receive band or second harmonic frequency band. The accentuation may also allow for a sharp roll-off in transmitted energy, avoiding transmissions at second harmonics. The range lobes generated by a sharp roll-off of the transmit spectrum are of less concern for second harmonic imaging. Where additional filter size or number of taps are available for transmit operation as compared to receive, alteration of the transmit waveform may be more advantageous than receive whitening, especially where receive filtering must account for second harmonic or frequency coded processes. By altering the transmit waveform to provide wider band imaging on receive, both the transmit based axial whitening and receive whitening may be used together to maximize wideband imaging.

In a first aspect, a method for axial whitening in diagnostic ultrasound imaging is provided. For an impulse-transmit total transfer function, one of a substantially non-equal spectral phase within the imaging frequency band and a substantially non-equal spectral magnitude is compensated. A transmit waveform responsive to the compensation is applied to a transducer. Signals responsive to the transmit waveform are applied to a detector. The signals applied to the detector have substantially white spectral amplitude and a substantially linear spectral phase within the imaging frequency band.

In a second aspect, a method for axial whitening in diagnostic ultrasound imaging is provided. Transmit waveforms are generated as a function of a system transfer function representing transmit and receive operation until detection. The transmit waveforms are different than a widest band transmit waveform available. Signals responsive to the generated transmit waveform are applied to the detector. Signals have a wider spectral magnitude at −6 dB down than where the transmit waveforms are the widest bandwidth available.

In a third aspect, a method for axial whitening in diagnostic ultrasound imaging is provided. A transmit pulse is generated. The transmit pulse has a first spectral content with a main lobe having two peaks on opposite sides of a center fundamental transmit frequency. A spectral amplitude at the center fundamental transmit frequency is less than 30 dB down from a greatest amplitude of the two peaks. The transmit pulses are applied to a transducer. Signals responsive to the application of the transmit pulses are received. The signals have a first bandwidth at 6 dB down of at least 50 percent of an available imaging bandwidth.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Axial whitening is provided through the generation of transmit waveforms. Transmit waveforms are generated as a function of a system transfer function representing transmit and receive operations until detection. The transmit waveforms are adapted from or different than a widest bandwidth transmitted waveform available. By using transmit waveforms adjusted away from a white or flat spectral magnitude so as to compensate for the system transfer function, a wider band or more white receive signal results. The signals applied to a detector have a wider spectral magnitude at −6 dB down than if the transmit waveforms with the widest bandwidth available were used. Rather than transmitting the widest band waveforms to get wideband receive signals, the transmit waveforms are compensated for the system response or transfer function.

Figure 1:
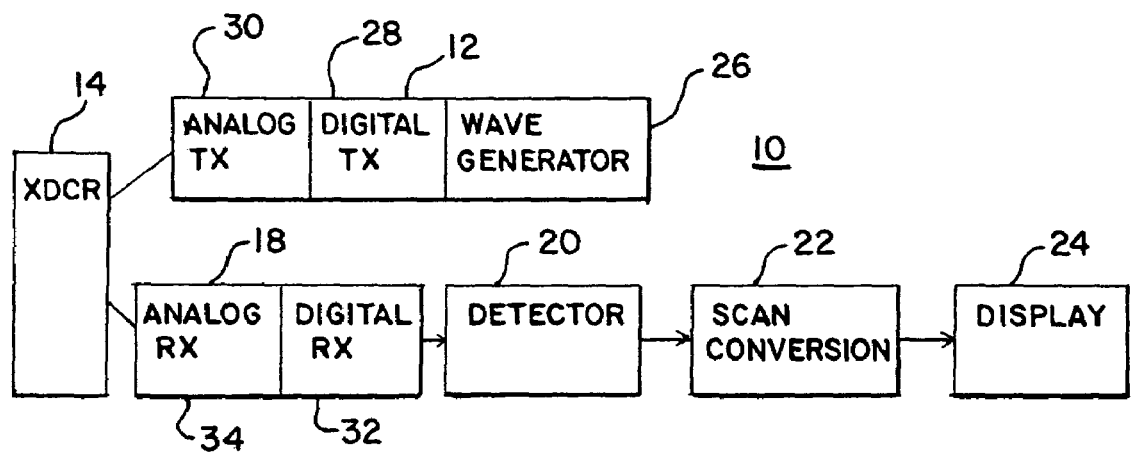
FIG. 1 is a block diagram of one embodiment of a system for transmit based axial whitening.

FIG. 1 shows one embodiment of a system 10 for transmit based axial whitening of receive signals. The system 10 includes a transmit beamformer 12, a transducer 14, a receive beamformer 18, a detector 20, a scan converter 22, and a display 24. Additional, different or fewer components may be provided. For example, a video filter for axial whitening of post-detected data is provided. As another example, the scan converter 22 is not provided where linear scanning is performed. In one embodiment, the system 10 is a medical diagnostic ultrasound system manufactured by Siemens Medical Solutions USA, Inc., such as the Sequoia® or Antares® ultrasound systems. Ultrasound systems by other manufacturers or systems used for material testing may also be used.

The transmit beamformer 12 includes a waveform generator 26, digital components 28 and analog components 30. In one embodiment, the transmit beamformer 12 is the transmit beamformer disclosed in U.S. Pat. No. 5,675,554, the disclosure of which is incorporated herein by reference. The waveform generator 26 is a memory for storing a plurality, such as 128, samples of an envelope of a transmit signal. The 128 samples output by the memory represent a 128 tap filter for generating a transmit waveform. To generate a widest band transmit waveform possible, a single sample, or unit output is used, resulting in uniform spectral amplitude and linear spectral phase. This waveform generator can be viewed as a first digital filter. In addition, other digital filters may be employed, for instance in association with up-sampling or decimation stages. For these additional filters also, unit response, or pass through mode, if available may provide for the widest bandwidth transmit waveform. The digital circuitry 28 includes multipliers, modulators, filters and other components for generating a digital representation of a transmit waveform. The analog circuitry 30 includes a digital-to-analog converter, amplifiers and other analog components. Transmit beamformers with different waveform generators, digital circuitry 28, and/or analog circuitry 30 may be used. For example, the waveform generator 26 is an oscillator for generating an analog waveform without the use of digital circuitry 28. As another example, the waveform generator 26 is a processor for calculating the digital samples representing an entire waveform, the carrier of the waveform and/or the envelope of the waveform. Any of various now known or latter developed transmit beamformers may be used, including analog, digital or combinations of analog and digital transmit beamformers.

The transmit beamformer 12 is configured as a plurality of channels connected with the transducer 14. Each of the channels is operable to generate a transmit waveform. Time or phase delays and amplifiers are used to apply delay and apodization profiles across a transmit aperture of a plurality of channels. The waveforms generated for application to the transducer 14 by the transmit beamformer 12 for each channel are either the same or different waveforms. In one embodiment, the transmit based axial whitening discussed herein is used for each of the transmit waveforms of all of the channels, but channel specific transmit axial whitening transmit waveforms may be used, or one or other subset of the channels may use other waveforms.

The transducer 14 is a one-dimensional, multi-dimensional or other now known or latter developed array of transducer elements. The transducer 14 is adapted for use external or internal to a patient. In response to the transmit waveforms provided from the transmit beamformer 12, the transducer 14 generates acoustic energy. The acoustic energy propagates to one or more targets 16, such as tissue in a patient. The targets 16 reflect acoustic energy back towards the transducer 14. For receive operation, the transducer 14 generates electrical signals representing the acoustic energy applied to the transducer 14 from the echoes. The transducer 14 connects with the receive beamformer 18 for providing the electrical signals. In one embodiment, the transducer 14 connects with the transmit beamformer 12 and the receive beamformer 18 through a multiplexer or transmit and receive switch, a connector for releasably connecting the transducer 14 to the system 10 and a plurality of coaxial or other cables allowing the transducer 14 to be spaced from the remainder of the system 10.

The receive beamformer 18 includes digital components 32 and analog components 34. In one embodiment, the receive beamformer 18 is the receive beamformer disclosed in U.S. Pat. No. 5,685,308, the disclosure of which is incorporated herein by reference. Different receive beamformers with more or fewer analog and digital components 32, 34 may be provided. The analog components 34 include amplifiers, filters, analog-to-digital converters or other now known or later developed analog components. The digital components 32 include filters, demodulators, summers, multipliers, processors, baseband filters, or other now known or latter developed digital components. The components of the receive beamformer 18 are configured in a plurality of channels for applying relative delays and apodization. Delayed and apodized information from each of the channels is then summed together to form beamformed samples. The beamformed samples are then filtered, such as being demodulated and filtered by a baseband filter. The output from the baseband filter is provided to the detector 20.

The detector 20 is a B-mode, F-mode, Doppler, M-mode, contrast agent mode or other now known or later developed detector. The detector 20 detects signals associated with desired information. For example, phase inversion, alternating line and phase, strain, strain rate, contrast agent, intensity, velocity, energy or other characteristics of a signal are detected. Information is detected at a fundamental frequency band (i.e., the frequency band of transmission). Alternatively, information is detected at other harmonic bands, such as the second harmonic, odd harmonics, or even harmonics. Any one or combination of transmit techniques and receive combinations, filtering or other processes are used to identify information at the desired frequency for detection. Any of various other techniques may be used for providing desired information to the detector 20, such as chirp coding, dynamic transmit focus, frequency compounding, spatial compounding, lateral or aperture whitening, or other now known or latter developed pre-detection techniques for imaging.

The detected information 20 is provided to the scan converter 22. The scan converter 22 converts the detected data between coordinate descriptions, such as from a polar coordinate format into a Cartesian coordinate or display format. The scan converted data is then generated as an image on the display 24. Where transmit based axial whitening is applied, the image on the display 24 may have improved axial bandwidth, robustness with respect to tissue attenuation, good clutter suppression for second harmonic operation, and/or good detail or contrast resolution due to wideband imaging. The transmit based axial whitening reduces the effects of bandwidth reduction caused by the analog and digital transmit circuitry 28, 30, the transducer 14, propagation through tissue, reflection off of the target 16, and the analog and digital receive circuitry prior to amplitude detection.

Figure 2:
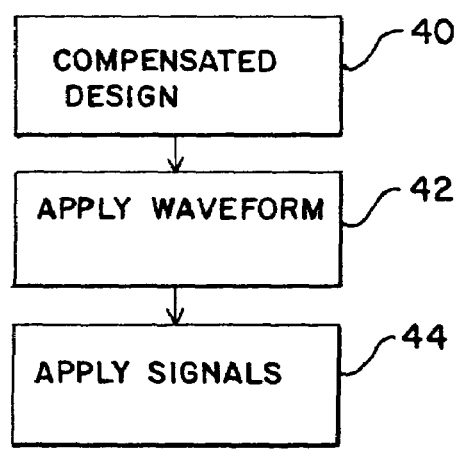
FIG. 2 is a flowchart representing one embodiment of a method for axial whitening.

FIG. 2 shows a method of one embodiment for wideband imaging with transmit based axial whitening. Transmit pulses are generated with spectral content operable to compensate for a system transfer function or inherent filtering of at least one of the transmit circuitry, transducer, acoustic propagation and receive circuitry. A desired transmit waveform is predistorted to accentuate the naturally attenuated frequency components within the imaging band as compared to the transmit waveform without the predistortion. In act 40, the transmit waveform is determined or created with the compensation for transfer functions. In act 42, the resulting waveform is applied to the transducer. In act 44, the signals with wideband content or generally whitened signals responsive to the transmitted waveform are applied to the detector. Additional, different or fewer acts may be provided.

In act 40, the created transmit waveform compensates for an impulse-transmit total transfer function. One or both of the substantially non-linear spectral phase within an imaging frequency band and a substantially non-equal spectral magnitude of the impulse-transmit total transfer function is compensated by the properties of the transmit waveform. Substantially non-equal spectral magnitude corresponds to a non-white or spectral magnitude without a flat spectral amplitude in at least a portion of the band of frequencies of interest. Substantially equal spectral magnitude is provided where the ratio of the −6 dB bandwidth to the −20 dB bandwidth of a signal is not less than 0.65 or is greater than 0.64. Other ratio values may be provided, such as greater than 0.60 or 0.70. Substantially linear spectral phase is where the phase does not vary by more than 90 degrees or varies less than 91 degrees within the frequency band defined by the −6 dB signal bandwidth with the linear trend of the phase removed. Time delays introduced by focusing result in a linear trend within the spectral phase. Linear regression and subtraction can be used to remove a linear trend of the spectral phase. Other values than 90 degrees may be provided, such as a variation peak-to-peak of less than 45 degrees. The spectral phase is linear over the imaging frequency band. The imaging frequency band is the range of frequencies used for imaging by the system 10. The imaging frequency band includes frequencies between −20 dB band edges of the total transfer function. Other values than −20 dB may be used, such as −40 dB.

The impulse-transmit total transfer function is a total transfer function of the system 10 from the transmit beamformer 12, through the receive beamformer 18, including the transducer 14, acoustic propagation and reflection from the target 16 until detection where any programmable characteristic of the transmit beamformer 12 is set to a widest bandwidth available. Each programmable filter stage prior to the transmission of the acoustic energy is set to a widest bandwidth mode possible for that filter stage. For example, any individual digital filter stage prior to transmit that support a unit pulse filter is set to the unit pulse. As another example, the shortest duration pulse possible in a unipolar or bipolar pulser is used.

The total transfer function of the system 10 is the transfer function of the entire signal path involved in the imaging of the target 16 until detection. The total transfer function includes all of the physical effects of ultrasonic pulse echo imaging, including diffraction, attenuation, scattering and non-linear effects (e.g., the generation of harmonics) that occur within the tissue interrogated by the system 10 as well as characteristics of the system 10.

The total transfer function is responsive to various system settings, such as the imaging frequency band. Where second harmonic or other harmonic imaging other than the fundamental transmit frequency band is used for imaging, the total transfer function is different than for imaging at the fundamental frequency band. One way of modeling generated second harmonics is to consider that the insonnifying pressure, P, at an echo target is modified by the non-linear operation $A*d/dt\,(P^2)$ prior to modeling scattering from the target and subsequent operations where A is a scale factor providing an adjustment to signal magnitude.

The total transfer function is established for given set of parameters or settings of the system 10. The impulse-transmit total transfer function is provided for the same given settings except with any programmable filter stage prior to the transducer on transmit being set to a widest possible mode.

Another factor for determining the total transfer function in a given situation is the echo target. The echo target 16 is considered in the definition of the total transfer function. For instance, a theoretically ideal impulse-echo target which scatters sound in an omni-directional manner in proportion to the sound pressure at the target 16 may be modeled or approximated. The target 16 provides for the round trip propagation by reflecting acoustic energy from the transmit back to the transducer 14 for receive processing. A pin target or similar discrete scatterer embedded within a material interrogated by the system 10 is a commonly used echo target which can be considered in determining the total transfer function of the imager.

To compensate for the impulse-transmit total transfer function, different transmit parameters are provided than associated with the parameters for as wide as possible bandwidth on transmit. Any one or all programmable transmit filters are set to other than a widest band setting.

Figure 3A:
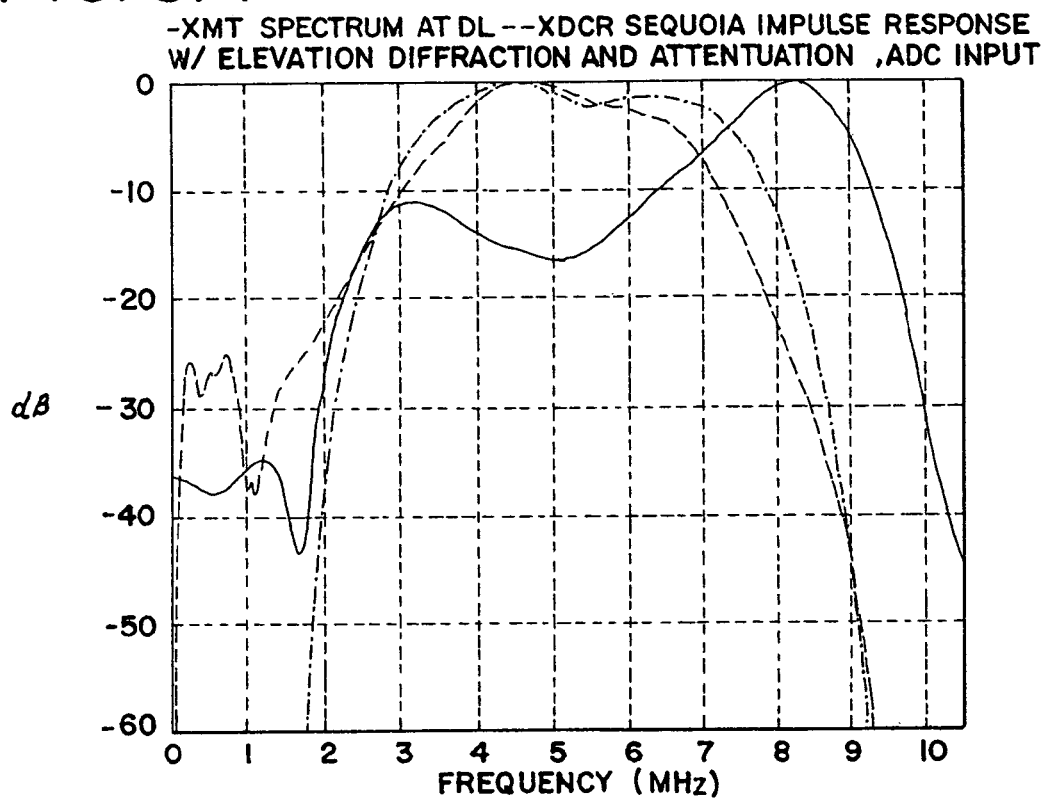
FIGS. 3A and 3B are graphical representations of various spectral responses.
Figure 3B:
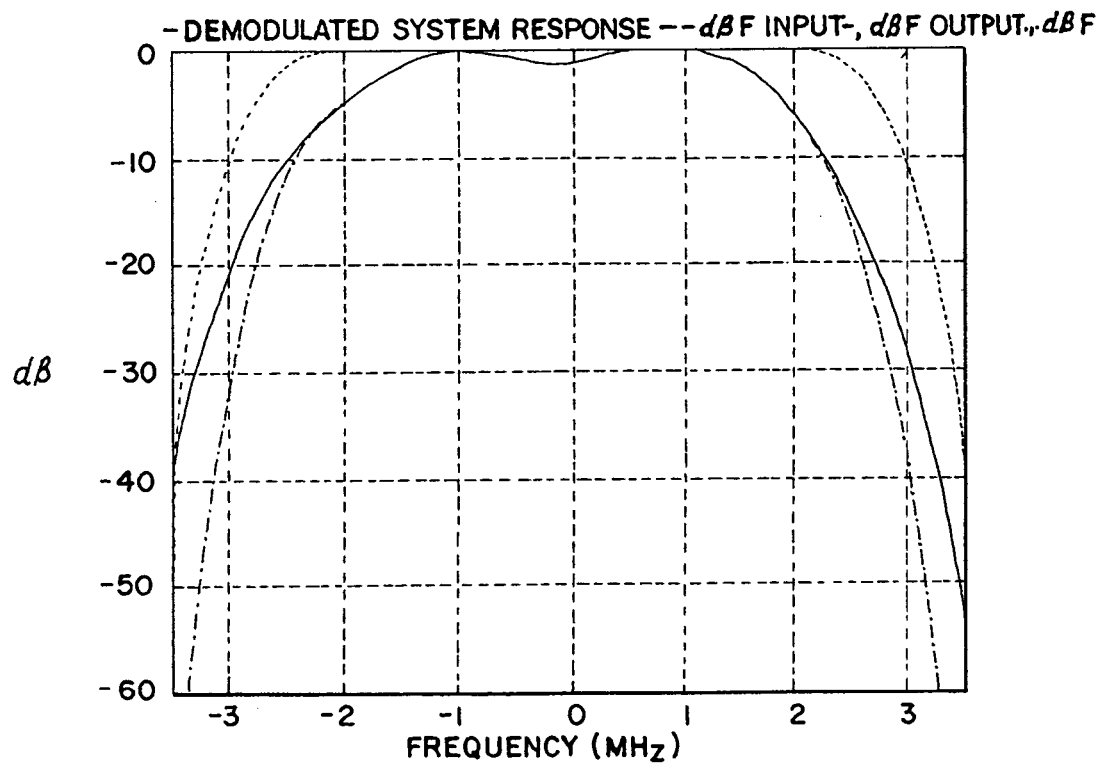

In act 42, a transmit waveform is applied to the transducer 14. The transmit waveform is generated with the spectral content adjusted from wideband as a function of the transfer function of the imaging system 10 from transmit waveform generation until the signal is provided to the detector 20. In one embodiment, the spectral magnitude of the transmit waveform at side bands of a frequency corresponding to a main lobe of the aforementioned transfer function is accentuated as compared to a widest bandwidth transmit waveform. For example, FIG. 3A shows a spectral magnitude 50 of a simulated transmit waveform applied to a connector or cable the transducer 14. The imaging frequency band is centered at about 5 Megahertz. On each side of 5 Megahertz are peaks representing accentuated side bands. FIG. 3A also shows the transfer response of the transducer 14, propagation, reflection, propagation back to the transducer 14, and further application of the transducer impulse response at dashed line 52. After application of the transmit waveform having the spectral magnitude 50 to the transducer 14, propagation, reflection, propagation back to the transducer, further application of the transducer impulse response to the receive signals and application of analog components up to an analog-to-digital converter of the receive beamformer 18 is represented by the spectral response 54. In part due to the accentuated side bands of the transmit waveform, the signal applied to the analog-to-digital converter as represented by the spectral magnitude 54 is more white (e.g., has a flat spectral amplitude around the 5 Megahertz center imaging frequency) and a wider bandwidth. FIG. 3B shows the same simulated signal as applied to the baseband filter at 56, as output by the baseband filter at 58 with the response of the baseband filter shown at 60 and the response of the system 10 including the transmit operations through demodulation at 62. As shown, the output of the baseband filter 58 has a white or flat spectral magnitude around the 0 frequency and extending for about 2.5 Megahertz on either side before reaching a −6 or −10 dB frequency.

Figure 4A:
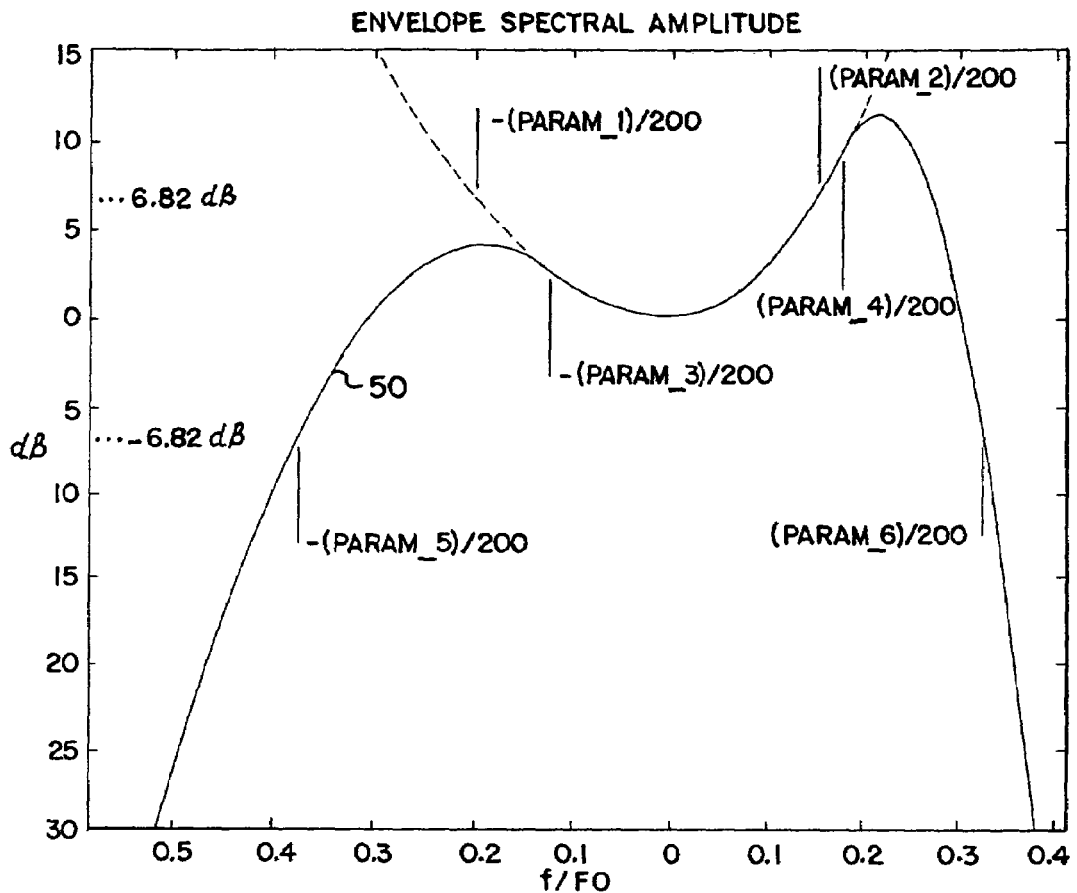
FIG. 4A is a graphical representation of a spectral magnitude of one embodiment of a transmit axial whitened transmit waveform that is also chirped by a quadratic component of phase.
Figure 4B:
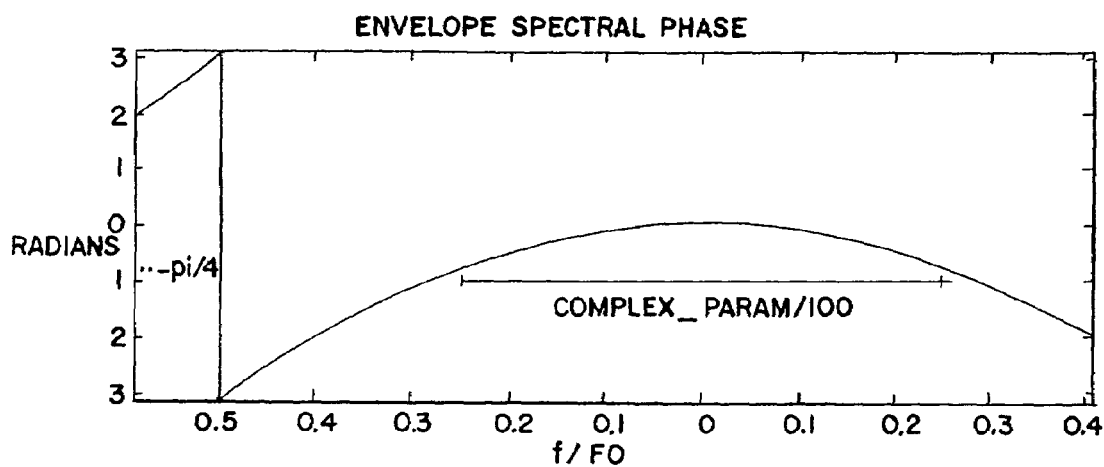
FIG. 4B is a phase profile plot of the transmit axial whitened transmit waveform of FIG. 4A.

FIG. 4A shows another embodiment or simulation of an envelope spectral amplitude 50 normalized to the spectral amplitude at the center frequency. In one embodiment, the envelope is used with a chirp carrier waveform (e.g., quadratic phase chirp coding), but a non-chirped waveform may be used with the nonsymmetrical spectral amplitude 50. FIG. 4B shows the spectral phase for the envelope of FIG. 4A. FIG. 5C shows a symmetric envelope spectral amplitude. Any of various now known or later developed carrier waveforms may be used.

Figure 5A:
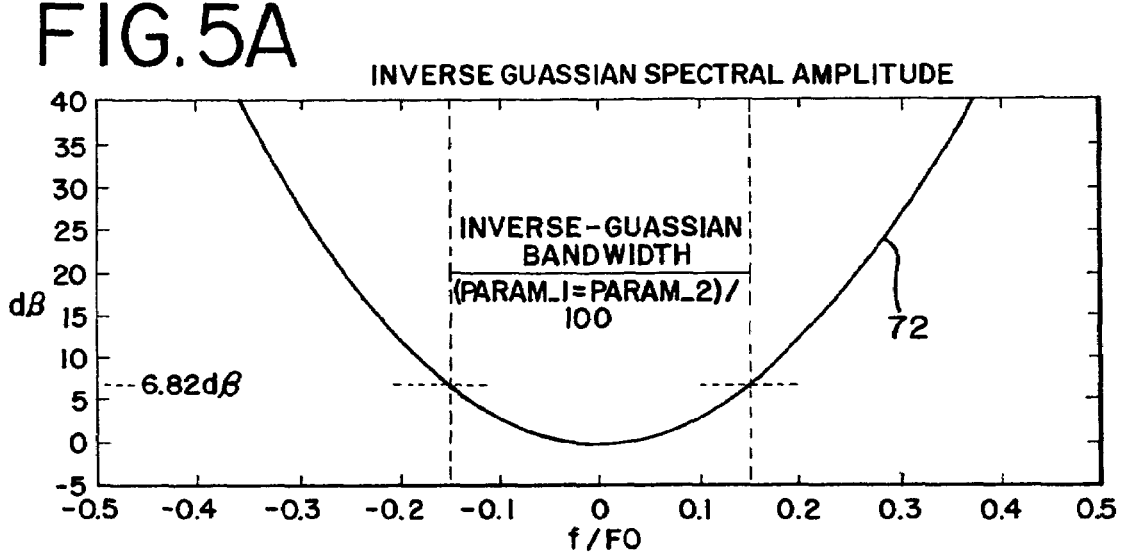
FIGS. 5A and 5B are graphical representations of two components for combination to form a transmit waveform with the spectral amplitude shown in FIG. 5C.
Figure 5B:
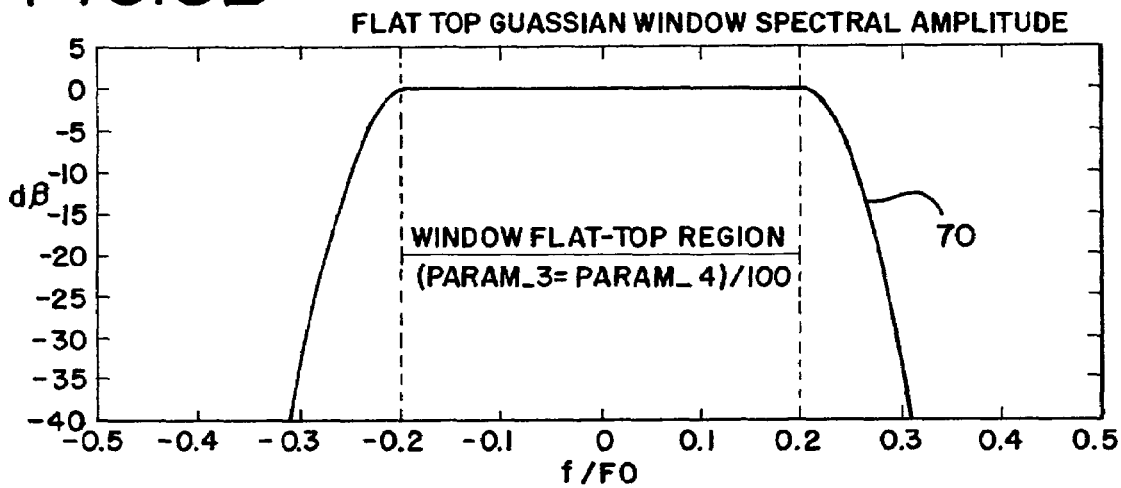
Figure 5C:
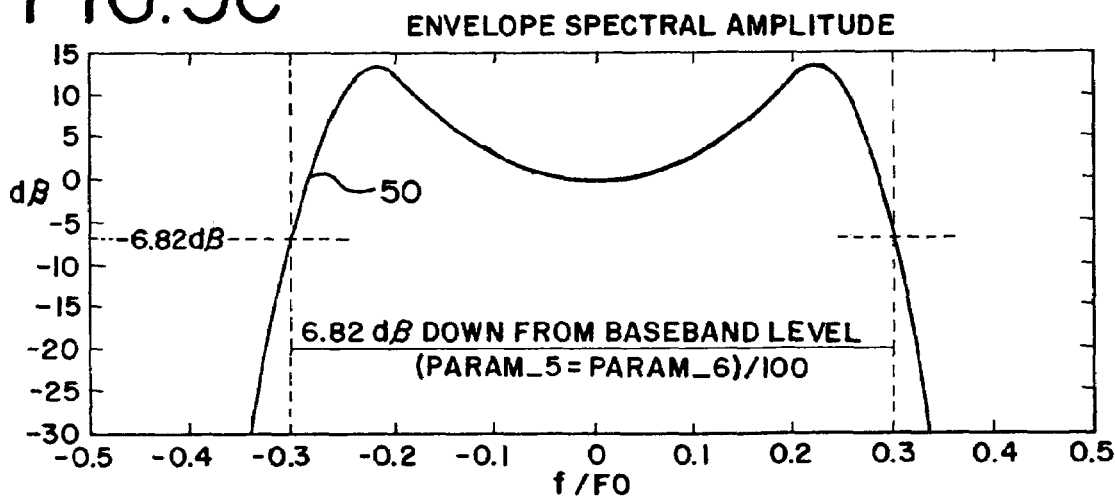

FIGS. 5A and 5B show two spectral amplitude components used to form the envelope spectral amplitude 50 of FIG. 5C for the transmit waveform applied to the transducer 14. The spectral amplitude 70 of FIG. 5B shows a white or wideband component centered at the fundamental transmit frequency. Two parameters specify the frequency extent on positive and negative normalized frequencies of the white, wideband or flat region of the spectral amplitude 70. To accentuate the side bands of the spectral amplitude 70 of FIG. 5B, an inverse Gaussian bandwidth spectral amplitude 72 shown in FIG. 5A is combined with the spectral amplitude 70. Two parameters define the 6.82 dB locations of the inverse Gaussian bandwidth 72. By combining the two spectral amplitudes 70 and 72 over a limited frequency range, the spectral content at the side band or side portions on both sides of the fundamental transmit frequency are accentuated relative to the amplitude at the fundamental transmit frequency. In the frequency domain of this embodiment, an inverse Gaussian with a flat top Gaussian windowing has independently specified positive and negative frequency portions.

In the transmit beamformer discussed above and disclosed in U.S. Pat. No. 5,675,554, the algorithm for generating envelope samples is modified to access a further subroutine and associated lookup table to define the spectral content for generating the envelope samples, such 128, 64 or other number of temporal envelope sample values for generating the transmit waveform. Upon initiating wideband imaging, the algorithm accesses the table defining the envelope, such as the table with 6 parameters represented as parameters 1 through 6 in FIGS. 4 and 5A–C. Whether or not to use a chirp waveform is also indicated. In one embodiment, each of the parameters is specified as a percentage of the center frequency, but absolute values or other representative values may be used. A positive or negative frequency cutoff as a width from the center frequency may be used to determine the percentages. Some of the parameters are associated with a −6 dB down location and other parameters are associated with the beginning of any roll-off, but other amounts of amplitude down may be used.

In this exemplary embodiment, the parameter 1 represents a left inverse Gaussian 6 dB bandwidth, parameter 2 represents a right inverse Gaussian 6 dB bandwidth, parameter 3 represents a left inner width or extent of a flat region, parameter 4 represents a right inner width, parameter 5 represents a left outer width or 6 dB down in an overall baseband level and parameter 6 represent a right outer width where left is negative or lower frequency and right is upper or higher frequency. Parameters 3 and 4 define the width or extent of flat top of a white region, and parameters 1 and 2 define the amount of droop at the center frequency or the amount of accentuation of the side bands. Parameters 3 and 4 also result in identification of the locations of the peaks of the accentuated side bands. Parameters 1, 3 and 5 independently control the negative frequency half of the envelope spectral amplitude 50, and parameters 2, 4 and 6 independently control the positive frequency half of the envelope spectral amplitude 50. Each of the six parameters is positive values, but negative values may be used in other representations. To fit the shape of the spectral amplitude 50 in an available sampling bandwidth, such as 128-tap transmit filter, the average of parameters 5 and 6 is less than 100 times the ratio of the envelope sample frequency to the transmit center frequency. FIGS. 5A through 5C represent parameters 1 and 2 being set to 30. The parameters 3 and 4 being set to 40 and the parameters 5 and 6 being set to 60 as a percentage of the center frequency. The spectral amplitudes of the two components 70 and 72 are multiplied to produce the envelope spectral amplitude 50 of the transmit waveform in FIG. 5C.

FIG. 4 shows another example where the positive and negative frequency parameters are set differently, such as the parameter 1 being 40, the parameter 2 being 30, the parameter 3 being 25, the parameter 4 being 35, the parameter 5 being 75 and the parameter 6 being 65. An amount of chirp is also set to provide a 50 percent bandwidth in the quadratic chirp coding phase profile applied to the envelope spectrum 50. The mathematical representation of the quadratic phase profile is defined in one embodiment as a Gaussian envelope so that the imaginary bandwidth is analogous to a −6.82 dB bandwidth, corresponding to −π/4 phase shift over a frequency change equal to half of this imaginary bandwidth. A positive concavity phase profile can be specified by a negative value of the chirp parameter. The quadratic phase profile is centered at the baseband or fundamental frequency.

Various parameters are defined above to represent the envelope spectral amplitude 50 for waveform generation. Different parameters, saved sample values in the time or frequency domain without parameters, or other now known or latter developed representation that the desired transmit waveform may be used.

The shape of the spectral amplitude may be accomplished in practice in different ways. As stated previously, the transmit beamformer disclosed in U.S. Pat. No. 5,675,554 may be used in one embodiment. By using such a beamformer, the desired spectral characteristics can be designed or computed directly and then transformed to a temporal representation that can be programmed and transmitted. This can occur with or without various chirp encoding means. A quadratic phase may be applied which results in a linear sweep of carrier frequency. A non-linear frequency sweep may also be employed. With the use of an appropriate de-chirping filter on receive, any of various chirp encoding schemes can be used in conjunction with transmit axial whitening to achieve wideband imaging.

The use of chirp coding in conjunction with transmit axial whitening can also enable the use of transmit axial whitening with transmit beamformers having limited programmability, such as unipolar or bipolar pulsers. Chirp encoding causes the frequency content of the pulse to be distributed in time, which allows the spectral amplitude function to be controlled by controlling the transmit amplitude in time. Also, pulse width modulation provides for flexible varying of the transmit amplitude for the case of unipolar and bipolar pulsers. Pending application Ser. No. 10/226,954, the disclosure of which is incorporated herein by reference, describes the control of the spectral content of the transmit function using chirp encoding in conjunction with amplitude windowing using pulse width modulation. This mechanism can also be used to control the spectral content of the transmit pulse to achieve wideband imaging via transmit axial whitening as described herein.

The shape of the spectral amplitude may be characterized in different ways. Each characterization may apply to some, all or only a subset of possible transmit spectral amplitudes adapted for wideband imaging. As shown in FIGS. 4 and 5C, a transmit pulse is generated having a spectral content with a main lobe having two peaks. The spectral amplitude between the two peaks is less than 30 dB down from a greatest amplitude of the two peaks. A lesser droop may be provided, such as where the amplitude between the two peaks is less than 2, 6, 10 or 15 dB down from a greatest of the two peaks. As a result, the transmit waveform has accentuated side lobes. As shown in FIG. 5C, the two peaks on the side bands may have a substantially same amplitude, and as shown in FIG. 4, the peaks may have different amplitudes. In one embodiment, a main lobe corresponds to 30 dB down from a greatest amplitude, but other main lobe characterizations may be used.

Less commonly than the spectrally bi-modal examples which have been principally discussed, sometimes, the primary feature of the impulse transmit total transfer function that is compensated for to achieve wideband imaging is an asymmetry of the spectral amplitude. For instance, a fundamental imaging band that resides entirely on one side of the peak of the impulse total transfer function is an example of such a situation. In such cases, whitening pulses that are substantially asymmetric is performed. Such pulses can be characterized by a frequency center of amplitude mass of the main lobe and the frequency of the greatest amplitude that are at least 15 percent different in frequency over the main lobe frequency range. Greater separations may be provided, such as 45 percent difference in frequency, and lesser separations may be provided, such as 25 or 10 percent differences in frequency. The frequency center of amplitude mass may be provided with or without a greater amplitude peak on opposite frequency sides in any asymmetric variation in amplitude.

Referring again to a whitening design where the imaging band includes the peak of the impulse transmit total transfer function, a feature of the spectral amplitude of whitening pulses designed for this situation is generally a spectral amplitude that displays flat slope at the frequency corresponding to the flat slope associated with the peak of the impulse total transfer function and then also has accentuation, or higher spectral amplitude, at frequencies away from this point of flat slope. Such a pulse can be characterized by spectral amplitude with a slope of amplitude that is less than 7 dB per octave that occurs at an amplitude level that is greater than 5 dB down from the maximum spectral amplitude.

Because the main lobe of spectral amplitude of the impulse transmit total transfer function is most often convex, or downwardly curving, such as may be approximate by a Gaussian form, the spectral amplitude of the whitening transmit waveform is often concave. Such a concave spectral amplitude can be characterized by a main lobe that satisfies that criteria such that there is a line segment that can be drawn between two internal points within the convex main lobe that cross outside of this main lobe by a difference in value between the line segment and the spectral amplitude function that is greater than or equal to 1 db.

FIG. 3A shows a simulation for fundamental imaging with a non-chirp axial response using a Siemens Medical Solutions transducer and a simulation of the axial response of a Sequoia® ultrasound system. The transmit beamformer generates the transmit waveform with a spectral response at the connector with the transducer 14 represented by the amplitude 50. The impulse response 52 represents a response of the transducer, the system transmit and receive electronics, elevation diffraction and attenuation (i.e., the total transfer function). The spectral amplitude of a signal applied to the analog-to-digital converter of the receive beamformer is represented at 54. The transmit spectral amplitude 50 combined with the response 52 produces the broadband signal spectral amplitude 54. FIG. 3B shows the broadband spectral response after further digital receive beamformation and baseband filtering of the receive beamformer 18. The broadband spectral response of the signal represented at dot-line 58 represents the signal applied to the detector in act 44. The spectral phase is substantially linear, or stated another way, with any linear trend removed the spectral phase is substantially constant, as applied to the detector.

Where modulation and demodulation frequencies are not equal for chirped waveforms, a temporal shift may occur. An additional temporal shift may occur with chirped asymmetric spectral magnitude designs due to the asymmetric truncation of the envelope in the time domain with quantization. Demodulation frequencies may be shifted to where a center of mass of the spectral amplitude is located to minimize such temporal shifts.

The design in the spectral magnitude and phase for wideband imaging discussed above may result in an increase or decrease in power relative to other types of transmit waveforms. The acoustic power may be increased or decreased based on government limits as a function of any designed waveform.

Where information is received at a band of frequencies around the fundamental transmit center frequency for imaging, the two peaks of the transmit waveform spectral amplitude are within 75 percent of and on opposite sides of the fundamental transmit frequency relative to the imaging frequency band. Where harmonic imaging is used, such as isolating echo data responsive to a second harmonic of a fundamental transmit frequency, the two peaks are at frequencies at least 25 percent less than the center of the second harmonic imaging frequency band and are on opposite sides of the center fundamental transmit frequency.

For either a fundamental or harmonic reception, the signals applied to the detector 20 provide for wideband imaging with good resolution and density of information. For a given imaging frequency band, such as the fundamental transmit frequency band or a second harmonic band of the fundamental transmit frequency band, optimum detail resolution and optimum normalized information density is achieved by a total transfer function characterized by a substantially equal spectral magnitude (e.g. a white or wideband spectral magnitude) and a substantially linear spectral phase within the imaging frequency band. Substantially equal spectral magnitude, as discussed above, provides a 6 dB to 20 dB ratio of 0.64 or higher. Substantially linear spectral phase, as discussed above, is a spectral phase within the imaging frequency band defined by the −6 db signal bandwidth with the linear trend of the phase removed not varying by more than 90°. By accentuating the sidebands of the transmit waveform, the signals applied to the detector have a wider bandwidth than is associated with transmission of the widest bandwidth transmit settings or widest bandwidth transmit waveform. A wider band of spectral content at the imaging frequency band is detected in response to the accentuated transmit waveform than from transmit waveforms at as wideband as possible without the accentuation.

The signals received at the detector or at the transmit beamformer have a bandwidth at 6 dB down frequencies that is at least 50% of the available imaging bandwidth in one embodiment. The bandwidth may be greater or lesser in other embodiments, such as 60% or 70% of the available imaging bandwidth. The available imaging bandwidth is given by the system and attenuation response, such as the spectral amplitude 52 shown in FIG. 3A. The signals applied to the detector have a substantially flat spectral amplitude throughout the bandwidth, resulting in the spectral content being generally white within the 6 db down bandwidth. The total transfer function and associated available imaging bandwidth is limited in part by the signal-to-noise ratio.

Accentuating side bands or adding of a second component deviating the transmit waveform from a widest or whitest possible spectral envelope results in a wider bandwidth imaging. Wider bandwidth imaging may provide better detail resolution. The minimum spacing of point targets distinguishable by the system 10 may be decreased. The normalized information density may also be increased. Normalized information density provides a measure of the detectability of soft tissue echogenicity in the presence of coherent speckle noise. Normalized information density is quantifiable as the inverse of the speckle variance times the average speckle area. A region of an image with a uniform target is identified. Variance in the brightness within that area indicates the speckle variance. The speckle area is measured as the width between 3, 6, 10 or other dB down values of the peak normalized autocorrelation function. By generating in or prior to the transmit beamformer a predistorted transmit waveform with differentially accentuated spectral content compensating for the total transfer function, wideband imaging is provided, resulting in improved resolution and information content. Providing substantially linear spectral phase prior to detection even for chirp waveforms, which results from proper de-chirping, provides for a desired axial response for wideband imaging.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit in the scope of this invention.

We claim:

1. A method for axial whitening in diagnostic ultrasound imaging, the method comprising:
   (a) for an impulse-transmit total transfer function, compensating for one of: a substantially non-linear spectral phase within an imaging frequency band and a substantially non-equal spectral magnitude;
   (b) applying a transmit waveform responsive to (a) to a transducer;
   (c) applying signals responsive to (b) to a detector, the signals having a substantially white spectral amplitude and a substantially linear spectral phase within the imaging frequency band.

2. The method of claim 1 wherein (a) comprises using different transmit parameters than provided with the transmit parameters set at a widest possible bandwidth.

3. The method of claim 1 wherein (a) comprises setting a programmable transmit filter other than at a widest band setting.

4. The method of claim 1 wherein the impulse-transmit total transfer function is a total transfer function of an imager from transmit, propagation, echo, receive and receive processing until detection where any programmable characteristic on transmit is set to a widest bandwidth available.

5. The method of claim 1 further comprising:
   (d) obtaining echo data responsive to (b) at the imaging frequency band centered at one of: a transmit fundamental frequency and a harmonic of the fundamental transmit frequency.

6. The method of claim 1 wherein (a) comprises compensating for both the substantially non-linear spectral phase within the imaging frequency band and the substantially non-equal spectral magnitude.

7. The method of claim 1 wherein (a) comprises compensating for the substantially non-linear spectral phase within the imaging frequency band.

8. The method of claim 1 wherein (a) comprises compensating for the substantially non-equal spectral magnitude.

9. The method of claim 1 wherein (b) comprises generating the transmit waveform having a first spectral magnitude content having a main lobe with two peaks on opposite sides of a fundamental transmit frequency, a spectral amplitude at the fundamental transmit frequency being less than 30 dB down from a greatest amplitude of the two peaks.

10. The method of claim 1 wherein (b) comprises accentuating spectral magnitude content at side bands of a main lobe as compared to a widest bandwidth transmit waveform, and wherein (c) comprises receiving the signals with a second spectral content, the second spectral content having a wider bandwidth than for the widest bandwidth transmit waveform, the wider bandwidth being a function of the accentuation.

11. The method of claim 1 wherein (c) comprises applying the signals having a whiter signal than associated with transmissions of whitest transmitter settings.

12. The method of claim 1 wherein (c) comprises applying signals having the spectral magnitude with a ratio of −6 dB bandwidth to −20 dB bandwidth greater than 0.64 and a spectral phase within the imaging frequency band given by −6 dB down with less than 91 degrees of variance where any linear trend of the phase removed.

13. The method of claim 1 wherein (a) and (b) comprise generating the transmit waveform with spectral content accentuated from wideband as a function of a transfer function of an imaging system from transmit until detection, and wherein (c) comprises detecting the signals having a wider band of spectral content at the imaging frequency band in response to the accentuated transmit waveform than from the transmit waveform at as wideband as possible without the accentuation.

14. The method of claim 1 wherein (c) comprises applying the signals having the spectral magnitude with the ratio greater than 0.70.

15. The method of claim 1 wherein (a) comprises using a chirp encoded transmit function and further comprising:
(d) decoding the chirp encoding prior to applying signals to a detector.

16. The method of claim 1 wherein (a) comprises using amplitude windowing of a chirp encoded transmit function by pulse width modulation.

17. A method for axial whitening in diagnostic ultrasound imaging, the method comprising:
(a) generating transmit waveforms as a function of a system transfer function representing transmit and receive operation until detection, the transmit waveforms being different than widest bandwidth transmit waveforms available; and
(b) applying signals responsive to (a) to a detector, the signals having a wider spectral magnitude at −6 dB down than where the transmit waveforms are at the widest bandwidth available.

18. A method for axial whitening in diagnostic ultrasound imaging, the method comprising:
(a) generating a transmit pulse having a first spectral content with a main lobe with two peaks on opposite sides of a center fundamental transmit frequency, a spectral amplitude at the center fundamental transmit frequency being less than 30 dB down from a greatest amplitude of the two peaks;
(b) applying the transmit pulse to a transducer;
(c) receiving signals responsive to (b), the signals having a first bandwidth at 6 dB down of at least 50% of an available imaging bandwidth.

19. The method of claim 18 wherein the spectral amplitude at the center fundamental transmit frequency is less than 15 dB down from the greatest of the two peaks.

20. The method of claim 18 wherein the main lobe corresponds to 30 dB down from the greatest amplitude.

21. The method of claim 18 wherein (c) comprises receiving centered at the center fundamental transmit frequency, the two peaks being within 75% of the fundamental transmit frequency.

22. The method of claim 18 wherein (c) comprises receiving at a second harmonic of the center fundamental transmit frequency, the two peaks being at frequencies at least 25% less than the second harmonic of the center fundamental transmit frequency.

23. The method of claim 18 wherein (a) comprises generating the transmit pulse with the spectral content operable to compensate for a transfer function of at least one of transducer, propagation and receive processing, wherein (c) comprises receiving with a second spectral content being white within the 6 dB down bandwidth.

24. The method of claim 23 wherein (a) comprises pre-distorting a transmit waveform, the pre-distortion accentuating the spectral content at the side bands of the main lobe as compared to the transmit waveform without the pre-distortion, and wherein (c) comprises receiving the signals with a second spectral content, the second spectral content having a wider bandwidth than for the transmit waveform without pre-distortion as a function of the accentuation.

25. The method of claim 18 wherein (a) comprises generating a chirp transmit pulse.

26. The method of claim 15 wherein (c) comprises receiving with the signals having a substantially flat spectral amplitude throughout the bandwidth.

27. The method of claim 18 wherein (c) comprises receiving with the first bandwidth at 6 dB down of at least 60% of an available imaging bandwidth.

28. The method of claim 18 wherein (c) comprises receiving with the first bandwidth at 6 dB down of at least 70% of an available imaging bandwidth.

29. The method of claim 18 wherein (c) comprises receiving with the first bandwidth being of a signal-to-noise ratio limited available imaging bandwidth.

30. The method of claim 18 wherein (c) comprises receiving with the first bandwidth being of a system response limited available imaging bandwidth.

31. The method of claim 18 wherein (a) comprises using amplitude windowing of a chirp encoded transmit function by pulse width modulation.

32. A method for axial whitening in diagnostic ultrasound imaging, the method comprising:
(a) generating a transmit pulse having a first spectral content with a center of amplitude mass of the main lobe and the frequency at the greatest amplitude are at least 15% different in frequency;
(b) applying the transmit pulse to a transducer;
(c) receiving signals responsive to (b), the signals having a first bandwidth at 6 dB down of at least 50% of an available imaging bandwidth.

33. The method of claim 32 wherein the center of amplitude mass of the main lobe and the frequency at the greatest amplitude are at least 25% different in frequency.

34. The method claim 32 wherein (a) comprises using amplitude windowing of a chirp encoded transmit function by pulse width modulation.

35. A method for axial whitening in diagnostic ultrasound imaging, the method comprising:
(a) generating a transmit pulse having a first spectral content with a slope in amplitude substantially at a peak of an impulse transmit transfer function is less than 7 dB per octave and the spectral amplitude at the center fundamental frequency is greater than 5 dB down from the greatest amplitude;
(b) applying the transmit pulse to a transducer;
(c) receiving signals responsive to (b), the signals having a first bandwidth at 6 dB down of at least 50% of an available imaging bandwidth.

36. The method of claim 35 wherein (a) comprises using amplitude windowing of a chirp encoded transmit function by pulse width modulation.

* * * * *